(12) United States Patent
Kutryk

(10) Patent No.: US 7,243,742 B2
(45) Date of Patent: Jul. 17, 2007

(54) DRILL PIPE SCREEN

(76) Inventor: Ed A. Kutryk, P.O. Box 5141, Station "A", Calgary, AB (CA) T2H 1X3

( * ) Notice: Subject to any disclaimer, the term of this patent is extended or adjusted under 35 U.S.C. 154(b) by 280 days.

(21) Appl. No.: 10/996,383

(22) Filed: Nov. 26, 2004

(65) Prior Publication Data
US 2005/0109503 A1    May 26, 2005

Related U.S. Application Data

(60) Provisional application No. 60/524,868, filed on Nov. 26, 2003.

(51) Int. Cl.
*E21B 43/38* (2006.01)
(52) U.S. Cl. .................. 175/314; 166/158; 166/278; 175/312; 210/448
(58) Field of Classification Search ............. 166/278, 166/378, 380, 158, 227, 234, 242.6; 175/312, 175/314; 210/448
See application file for complete search history.

(56) References Cited

U.S. PATENT DOCUMENTS

| 3,450,207 | A | * | 6/1969 | Hirsch | 166/233 |
| 4,495,073 | A | * | 1/1985 | Beimgraben | 210/448 |
| 6,598,685 | B1 | * | 7/2003 | Mashburn | 175/57 |
| 6,976,546 | B2 | * | 12/2005 | Herst | 175/57 |
| 2003/0150616 | A1 | * | 8/2003 | Mashburn | 166/311 |
| 2006/0065443 | A1 | * | 3/2006 | Hall et al. | 175/314 |
| 2006/0065444 | A1 | * | 3/2006 | Hall et al. | 175/314 |

* cited by examiner

*Primary Examiner*—Jennifer H Gay
(74) *Attorney, Agent, or Firm*—Sean W Goodwin; Jacquelyn Van Lierop

(57) ABSTRACT

A retrievable drill pipe screen is adapted for releasable connection within a drill pipe string. The screen has a planar support plate for connecting a perforated tubular screen body to a fish neck wherein the plane of the planar support plate is generally parallel to the axis of the screen body. The orientation of the planar support plate provides minimal resistance to fluid flowing into the screen body while also reducing vortex effects that cause wear of screen components. Preferably, a wear distributor sleeve is fit within the screen body for protecting against wear of the screen caused by fluid flow and a retaining rod can secure the bottom of the screen body to the fish neck in the event that a lower portion of the screen body becomes detached.

18 Claims, 5 Drawing Sheets

DRILL PIPE SCREEN

CROSS-REFERENCE TO RELATED APPLICATIONS

This application claims the benefit of U.S. provisional application No. 60/524,868, filed Nov. 26, 2003, the entirety of which is herein incorporated by reference.

FIELD OF THE INVENTION

The invention relates to screens and in particular to retrievable screens for fitting within the bore of a pipe, such as a drill pipe.

BACKGROUND OF THE INVENTION

In the drilling of a subterranean rock formation, tubing such as a drill stem assembly or drill pipe string conducts drill mud or drilling fluids downhole to tools such as mud motors or a drill bit. Drilling fluids are circulated downhole through the tubing for a variety of purposes including carrying drill cuttings up an annulus about the tubing and to the surface for screening, reconditioning and recirculation. In drilling with coiled tubing, mud motors are powered by the flow of drilling fluids and are used to rotate the bit. In conventional rotary drilling, the drill pipe string is used to rotate the bit. In either case, there are one or more connections in which a screen can be installed to intercept debris and other oversize material carried by the drilling fluids which could interfere with the downhole tools. Ideally, a retrievable screen is used such that the screen may be occasionally removed, cleaned and reinstalled without having to extract the tubing from the hole.

A variety of retrievable drill pipe screens have been disclosed in the prior art. Some prior art screens are supported on a mounting collar that is sandwiched between interconnecting uphole pipe and downhole pipe of a drill pipe string. Such screens comprise a screen support ring that is adapted to releasably engage the mounting collar and from which a screening member depends downhole into the bore of the downhole pipe. Conventional means for enabling retrieval of the screen from the drill pipe string include a fish neck connected to the screen support ring and which extends uphole therefrom. The fish neck is engageable by a conventional overshot fishing tool for pulling the fish neck and screen free from the mounting collar. Sometimes the fish neck is connected to the screen support ring by leg support members that are welded to the fish neck and the support ring in a so-called "pyramid" or "spider leg" configuration. Alternatively, as disclosed in U.S. Pat. No. 4,495,073, the fish neck may be connected to the screen by a bridging bar secured in transverse relationship to the screen support ring onto which the fish neck is centrally attached.

Applicant has found that such prior art means for attaching a fish neck to a screen may restrict flow of fluid into the screen and thereby impede the rate of flow of fluid down the drill stem. Furthermore, such restrictions do little to alleviate wear due to fluid flow conditions including vortices in the fluid flowing through the screen and also that due to pressure difference thereacross which accentuates wear. Wear can result in various failure modes including: of the screening member, of the attachment between the screening member and the screen support ring, and of the attachment between the fish neck and the support ring.

There is, therefore, a need in the art for an improved retrievable pipe screen.

SUMMARY OF THE INVENTION

A retrievable drill pipe screen is provided for intercepting debris flowing through the pipe while minimizing disturbance of the flow of the drilling fluids and which is less susceptible to wear as compared with conventional retrievable drill pipe screens.

In one embodiment of the invention, a planar support plate connects an uphole extending fish neck with a downhole extending tubular screen body whereby the plane of the support plate is aligned with the flow of the drilling fluids. The orientation of the support plate thereby minimizes the effect of the support plate on the flow of the drilling fluid from an uphole pipe, and through the screen body into a downhole pipe. At the same time, longitudinally extending planar surfaces of the planar support plate interfere with vortex motion of the drilling fluids as it enters the screen body, thereby lessening erosive wear on screen components.

Accordingly, in a broad aspect of the invention, a retrievable drill pipe screen is provided comprising a perforated tubular screen body having an inner sidewall surface, a bottom and an open top, the screen body sized to fit within the bore of the pipe; a fish neck projecting outwardly from the open top and generally positioned along an axis of the screen body; at least one planar support plate extending between the fish neck and the screen body, the plane of which is generally parallel to the axis, each of the at least one planar support plate having a first edge attached thereby to the fish neck, and having an opposing second edge attached thereby to the inner sidewall surface of the screen body; and a releasable connection for interconnecting the retrievable screen with the pipe, wherein a retrieving force applied to the fish neck is transferred to the screen body and wherein the retrieving force effects disconnection of the releasable connection, thereby permitting retrieval of the retrievable screen from the bore of the pipe.

Preferably, the screen body has a conical shape with a rounded, cup-shaped end to aid in cleaning of the screen body when removed from the pipe. To reinforce the integrity of the screen body, the retrievable screen may further comprise a retaining rod extending between the fish neck and the bottom of the screen body and attached thereto.

The releasable connection may include any connection that provides sufficient strength to support the drill pipe screen while in operation, but which can be disconnected when required without causing detachment of the fish neck from the screen body. A suitable such releasable connection includes a screen support ring from which the screen body downwardly depends and which is adapted to be supported an annular mounting collar that is secured within an annular recess defined by the pipe, whereby an upwardly facing annular shoulder of the mounting collar abuts with a downwardly facing surface of the screen support ring. The screen support ring and mounting collar are releasably connected by at least one radially disposed shear pin connecting radially adjacent portions of the mounting collar and screen support ring.

In another embodiment of the invention, a wear distributor sleeve is provided that is fit within the screen body and positioned at the uphole end thereof. The wear distributor sleeve protects the screen body against vortex motion of the drilling fluid as it enters the screen body. When a wear distributor sleeve is included in the screen, the planar support plate is attached directly to the inner sidewall surface of the wear distributor sleeve. To reduce blockage of the screen body by the wear distributor sleeve, extraneous material of the wear distributor sleeve, such as where the planar support plate is not attached and where the wear distributor sleeve does not protect against the vortex effects of the drilling fluid, may be removed.

DESCRIPTION OF THE PREFERRED EMBODIMENT

Figure 1:
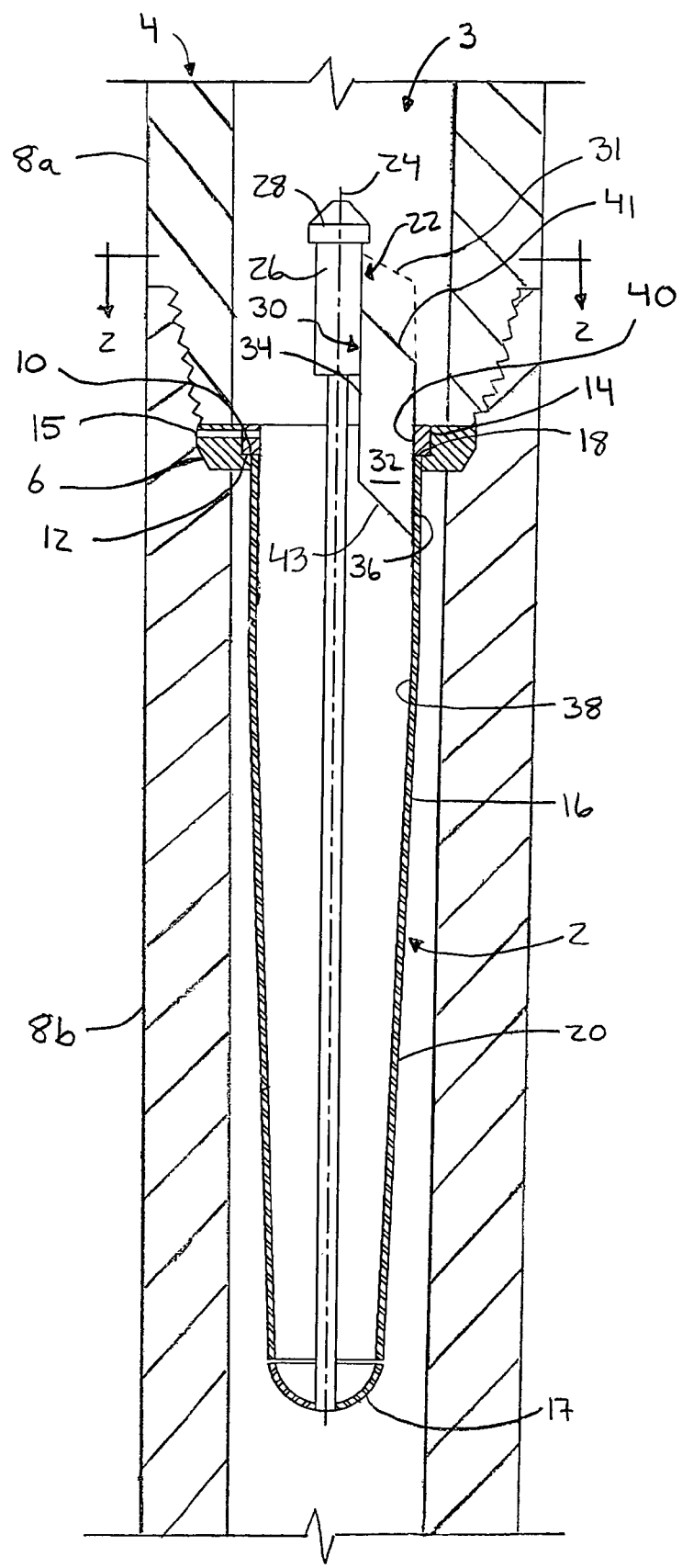
FIG. 1 is a cross-sectional view of one embodiment of a retrievable screen of the present invention installed in a drill pipe.
Figure 2A:
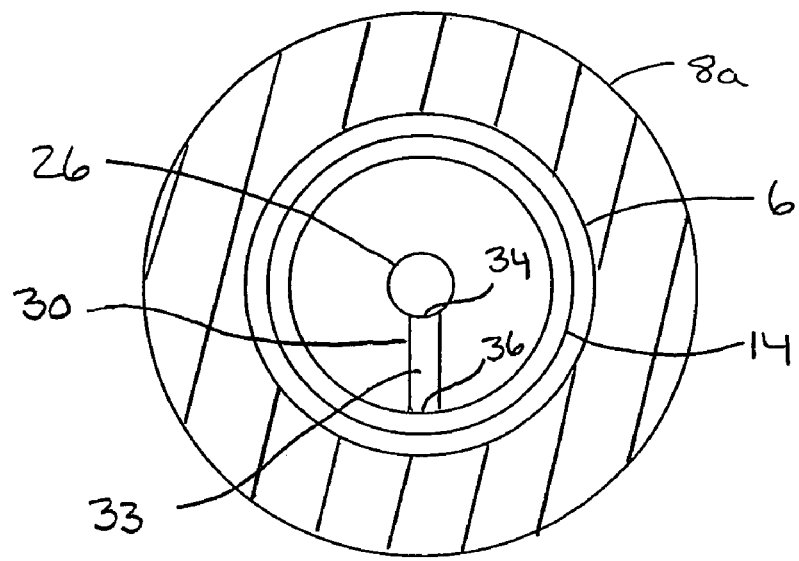
FIG. 2A is a sectional view taken along lines 2—2 of FIG. 1.
Figure 2B:
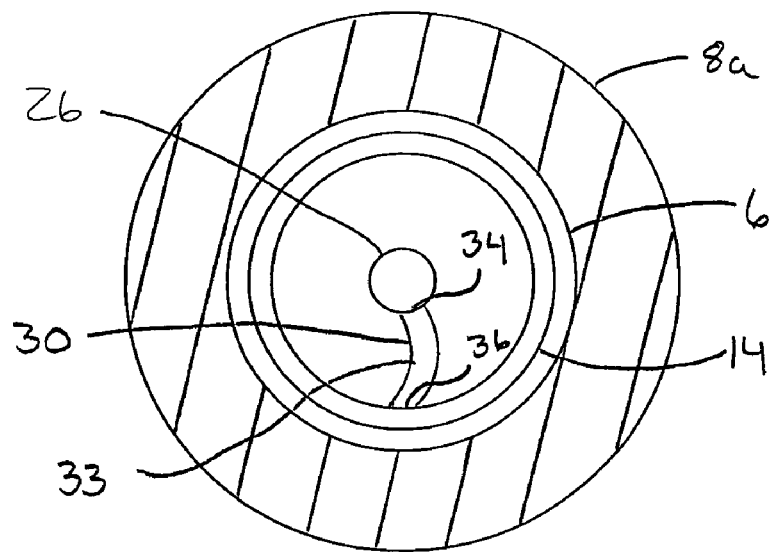
FIG. 2B illustrates another embodiment of a planer support member herein the support member has a planar curve configuration.

With reference to FIGS. 1 and 2, a drill pipe screen 2 is shown installed within the bore 3 of a drill pipe string 4. Generally, the components of the screen are sized according to the inner diameter of the pipe being used and are preferably constructed of wear and corrosion resistant material such as 316 stainless steel. The components are securely attached to each other as indicated herein by any suitable means known in the art, such as, for example, by welding.

With reference to FIG. 1, the screen 2 comprises an elongate and perforated tubular screen body 16 which is securely attached to a screen support ring 14 and extends downhole therefrom. An uphole open top end 18 of the screen body 16 abuts to a downwardly facing surface 12 of the screen support ring 14.

The drill pipe screen 2 is adapted for support upon an annular mounting collar 6 that is anchored within the bore of the pipe. Typically, the mounting collar is sandwiched within an annular recess defined between two interconnected pieces of uphole pipe 8a and downhole pipe 8b. The mounting collar 6 defines an upwardly facing annular shoulder 10.

The downwardly facing surface 12 of the screen support ring 14 is abuttingly engageable and supported upon the upwardly facing annular shoulder 10. At least one, and preferably several radially disposed shear pins 15 extend between the mounting collar 6 and the support ring 14 to provide a releasable connection for interconnecting the screen with the drill pipe string 4.

In operation, drilling fluids flowing downhole enters the open top end 18 of the screen body from the uphole pipe 8a and passes through the screen body 16 into the downhole pipe 8b. Perforations 20 in the screen body 16 are sized to permit ready passage of drilling fluids therethrough but to trap, within the screen body, oversized particles which could potentially damage downhole tools. Preferably, the downhole bottom end of the screen body 16 is fit with a rounded, cup-shaped end piece 17 of screen material. As compared to a flat bottom end, the cup-shaped end piece 17 is less susceptible to failure when subjected to the fluid pressures of the drilling fluids and loading of trapped particles.

To enable retrieval of the screen 2 when required, a fish neck 22 is provided that extends outwardly from the screen support ring 14 and into the uphole pipe 8a. The fish neck 22 is generally positioned along an axis 24 of the screen body 16 and of the drill pipe string 4, thereby centering the fish neck with the screen body 16 and the screen support ring 14. The fish neck 22 is any conventional fish neck already known in the art, such as that generally having a cylindrical post member 26 with a mushroom shaped tip 28.

The fish neck 22 is connected to screen body 16 by a planar support plate 30 that extends generally radially between the fish neck 22 and screen body 16. Broadly stated, the planar support plate has two opposing planar surfaces 32 and a cross-sectional thickness 33 when sectioned transverse through the support plate. The support plate 30 is oriented to minimize disruption of fluid flow from the uphole pipe 8a into the screen body 16. Notably, the generally radially and longitudinally extending planar surfaces 32 interfere with any swirling or vortex motion of the drilling fluids flowing therethrough. Retardation of such vortex motion is useful in lessening erosive wear of the screen components.

In particular, a plane 31 through or tangent to the planar support plate 30 is generally parallel to the axis 24 such that the planar support plate 30 is in longitudinal relationship along said axis 24, thereby providing a longitudinal first edge 34 that is securely attached to the post member 26 and an opposing longitudinal second edge 36 that is securely attached to the inner sidewall 38 of the screen body 16 and to the inner sidewall 40 of the screen support ring 14. The attachment of the planar support plate 30 to the screen body 16 may be achieved by, for example, plug welding through the perforations 20. Some examples of the transverse cross-sections of planar support plates include "I" (FIG. 2A), "C" (FIG. 2B), and "V" (Not shown). The flat, planer "I" support plate provides the least resistance to fluid flow thereby.

The planar support plate 30 may be of any suitable shape, providing that the longitudinal first and second edges 34, 36 generally conform to the surface to which they respectively attach. Preferably, the support plate 30 is a flat, wing-shaped parallelogram whereby a resultant, downwardly angled leading edge 41 increases the aerodynamic entry of drilling fluid past the support plate 30. Furthermore, a corresponding angled trailing edge 43 results where the support plate is cut from flat bar stock with little waste of material. In any case, the cross-sectional thickness 33 of the support plate 30 should be as thin as possible to minimize flow restriction and pressure drop across the open top end 18 of the screen body 16 while providing sufficient structural support for retrieval of the drill pipe screen 2. Typically, the cross-sectional thickness 33 would not exceed the cross-section of cylindrical post 26 of the fish neck as seen particularly in FIG. 2.

To retrieve the drill pipe screen 2, a conventional overshot tool engages the tip 28 of the fish neck and an upward force is exerted to effect shearing of the shearing pins 15 and detachment or disconnection of the screen support ring 14 from the mounting collar 6. The portions of the screen 2 comprising the screen support ring 14, screen body 16, fish neck 14, and support plate 30 are lifted out of the drill pipe string 4. The screen can be inverted at the surface to remove trapped particles from the screen body 16. While the screen body 16 may be of any suitable tubular shape, the truncated conical shape with the cup-shaped end piece 17 depicted in the Figures aids in the release of accumulated debris from the screen during cleaning.

Although the invention has thus been described as having one planar support plate 30, more than one planar support plate can be used. For example, FIGS. 2–5 show a drill pipe screen 2 having two opposing planar support plates 30. Additional support plates 30 are particularly useful for increasing the strength of the fish neck 22 attachment to the screen 2 relative to the strength of the interconnection between the screen support ring 14 and the mounting collar 6, thereby reducing the likelihood of the fish neck detaching from the screen body 16 during retrieval. Additional support plates 30 are also useful when increased support of the fish neck 22 is required with larger screen bodies 16 and to provide additional support of the fish neck 22 during forceful cleaning efforts.

Optionally, a retaining rod 42 is provided that extends along axis 24 between the post member 26 of the fish neck 22 and the cup-shaped end piece 17. In the event that circumferential wear of the screen body 16 occurs below the support plate 30, the retaining rod will minimize opportunity for detached pieces of the screen body 16 to enter the downhole pipe 8b and potentially interfering with downhole processes. The retaining rod 42 also provides additional support to the fish neck during cleaning procedures.

Figure 3:
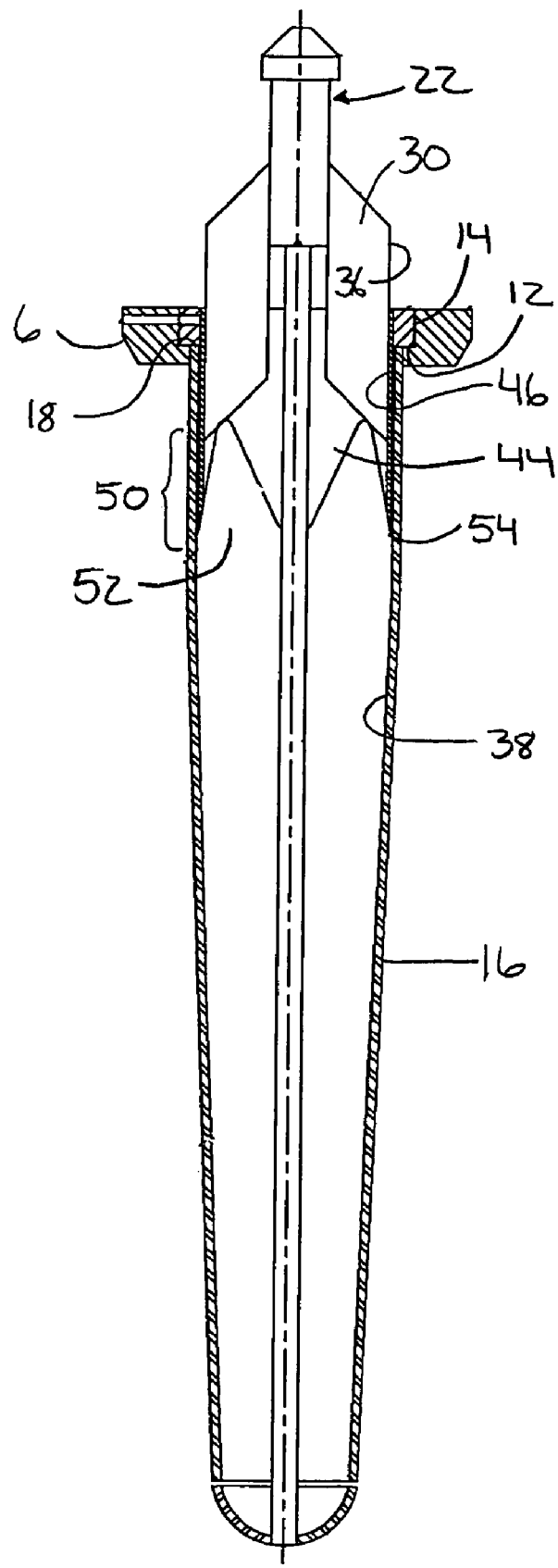
FIG. 3 is a cross-sectional view of another embodiment of the retrievable screen of the present invention.
Figure 4:
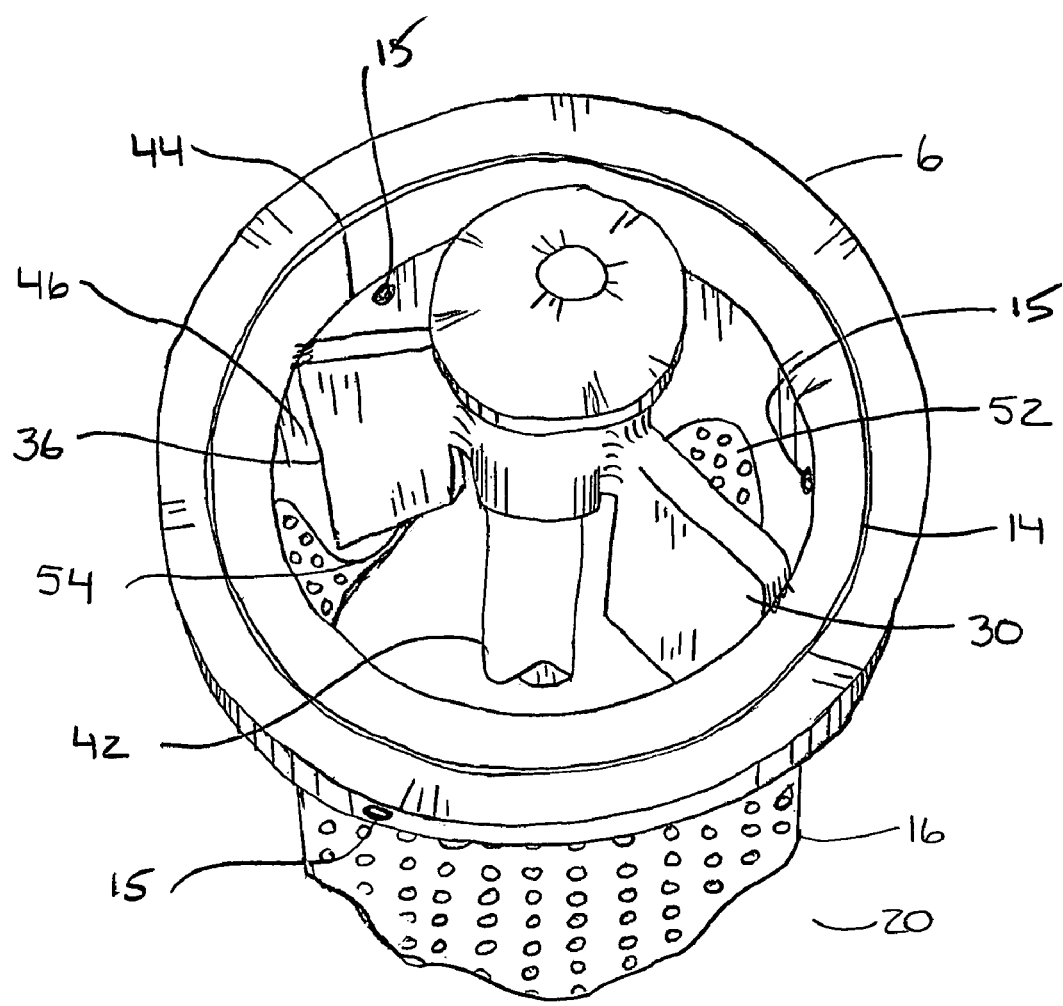
FIG. 4 is a top perspective view of the embodiment of FIG. 3 with the downhole portion of the screen body partially removed.
Figure 5:
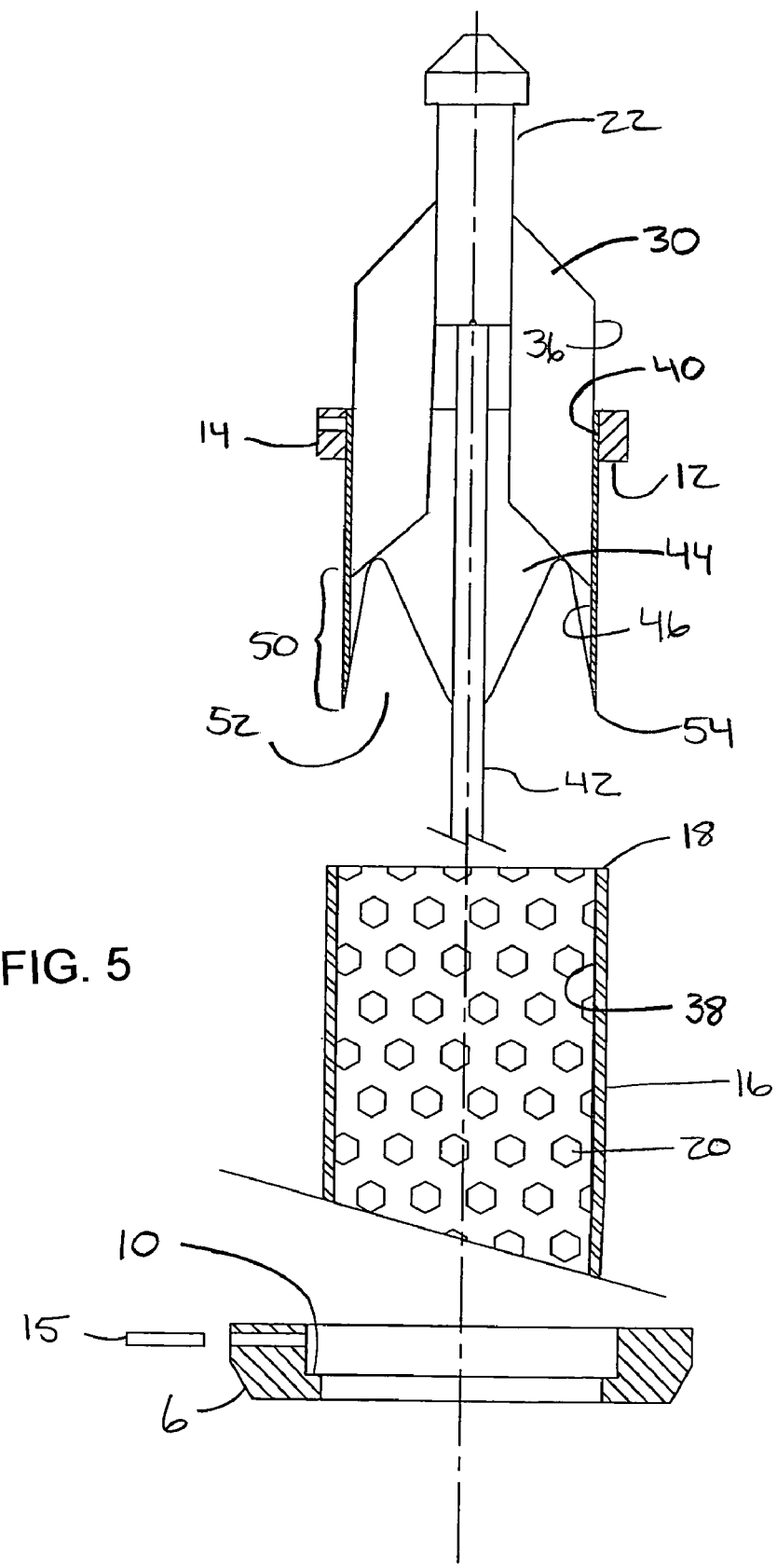
FIG. 5 is an exploded view of the embodiment of FIG. 3 illustrating the mounting collar and a shear pin, a partial view of the screen, and a combined view of fish neck, support plate, screen support ring, wear distributor sleeve, and retaining rod.

With reference to FIGS. 3–5, in another embodiment, the drill pipe screen 2 can be fit with a tubular wear distributor sleeve 44 positioned adjacent to the inner sidewall 40 of the screen support ring 14 and extending downhole therefrom. The wear distributor sleeve 44 is securely attached to the screen support ring 14, such as through welding along the circumferential interface therebetween. The second longitudinal edge 36 of the planar support plate 30 is securely attached to screen body 16 through an inner sidewall of 46 of the wear distributor sleeve 44. An assembly of the fish neck 22, planar support plate 30, screen support ring 14, and wear distributor sleeve 44 is thus provided. The wear distributor sleeve 44 is fit into the screen body 16 until the downwardly facing surface 12 of the screen support ring 14 abuts the top 18 of the screen body. The wear distributor sleeve 44 is then securely attached to the inner sidewall 38 of the screen body 16, such as by plug welding through the perforations 20 in the screen body 16. Preferably, the support plate 30 is attached to both the wear distributor sleeve 44 and the screen body 16, for example, by plug welding through the screen body perforations 20 and one or more slots (not shown) formed in the wear distributor sleeve 44. The surface area of the wear distributor sleeve 44 which blocks the perforations 20 can be minimized while still providing protection against wear. For example, as best shown in FIGS. 3 and 4, the sidewall of the lower portion 50 of the wear distributor sleeve 44 can be a scallop shape having notches 52 extending upwardly from the bottom 54 of the wear distributor sleeve 44 where the planar support plate 30 is not attached thereto.

Although preferred embodiments of the invention have been described in some detail herein above, those skilled in the art will recognize that various substitutions and modifications of the invention may be made without departing from the scope of the invention as defined by the claims as defined herein.

The invention claimed is:

1. A retrievable screen for fitting within the bore of a pipe comprising:
    a perforated tubular screen body having an inner sidewall surface, a bottom and an open top, the screen body sized to fit within the bore of the pipe;
    a fish neck projecting outwardly from the open top and generally positioned along longitudinal axis of the screen body;
    at least one planar support plate extending between the fish neck and the screen body, the plane of which is generally parallel to the longitudinal axis, each of the at least one planar support plate having a first edge attached thereby to the fish neck, and having an opposing second edge attached thereby to the inner sidewall surface of the screen body; and
    a releasable connection for interconnecting the retrievable screen with the pipe, wherein a retrieving force applied to the fish neck is transferred to the screen body and wherein the retrieving force effects disconnection of the releasable connection, thereby permitting retrieval of the retrievable screen from the bore of the pipe.

2. The retrievable screen of claim 1 having two opposing planar support plates.

3. The retrievable screen of claim 1 wherein the at least one planar support plate has a downwardly angled leading edge extending between the first and second edges and facing outwardly from the open top.

4. The retrievable screen of claim 3 wherein the at least one planar support plate is a parallelogram.

5. The retrievable screen of claim 1 wherein the screen body has a cup-shaped bottom.

6. The retrievable screen of claim 1 wherein the screen body is conical.

7. The retrievable screen of claim 1 further comprising a retaining rod extending longitudinally between the fish neck and the bottom of the screen body and attached thereto.

8. The retrievable screen of claim 1 wherein the releasable connection further comprises:
    a screen support ring from which the screen body downwardly depends away from the fish neck;
    an annular mounting collar anchored within the bore of the pipe, the mounting collar defining an upwardly facing annular shoulder wherein a downwardly facing surface is abuttingly engageble and supported upon the upwardly facing annular shoulder; and
    at least one radially disposed shear pin extending between the screen support ring and the mounting collar, wherein the retrieving force shears the at least one shear pin and disconnects the screen support ring from the mounting collar.

9. A retrievable screen for fitting within the bore of a pipe comprising:
    a perforated tubular screen body having a bottom and an open top, the screen body sized to fit within the bore of the pipe;
    a tubular wear distributor sleeve positioned within the screen body, the wear distributor sleeve having a sidewall with an inner sidewall surface, a top end and a bottom end, the top end adjacent to the open top of the screen body;
    a fish neck projecting outwardly from the open top and generally positioned along an axis of the screen body;
    at least one planar support plate extending between the fish neck and the wear distributor sleeve, the plane of which is generally parallel to the axis, each of the at least one planar support plate having a first edge attached thereby to the fish neck, and having an opposing second edge attached thereby to the inner sidewall surface of the wear distributor sleeve; and
    a releasable connection for interconnecting the retrievable screen with the pipe, wherein a retrieving force applied to the fish neck is transferred to the screen body and wherein the retrieving force effects disconnection of the releasable connection, thereby permitting retrieval of the retrievable screen from the bore of the pipe.

10. The retrievable screen of claim 9 wherein the sidewall of the wear distributor sleeve defines at least one notch extending from the bottom end, the second edge of the at least one planar support plate attached to the wear distributor sleeve adjacent to the at least one notch.

11. The retrievable screen of claim 10 wherein the at least one notch provides a scalloped shaped bottom end.

12. The retrievable screen of claim 9 having two opposing planar support plates.

13. The retrievable screen of claim 9 wherein the at least one planar support plate has a downwardly angled leading edge extending between the first and second edges and facing outwardly from the open top.

14. The retrievable screen of claim 13 wherein the at least one planar support plate is a parallelogram.

15. The retrievable screen of claim 9 wherein the screen body has a cup-shaped bottom.

16. The retrievable screen of claim 15 wherein the screen body is conical.

17. The retrievable screen of claim 9 further comprising a retaining rod extending between the fish neck and the bottom of the screen body and attached thereto.

18. The retrievable screen of claim 9 wherein the releasable connection further comprises:
   a screen support ring from which the screen body downwardly depends away from the fish neck;
   an annular mounting collar anchored within the bore of the pipe, the mounting collar defining an upwardly facing annular shoulder wherein a downwardly facing surface is abuttingly engageble and supported upon the upwardly facing annular shoulder; and
   at least one radially disposed shear pin extending between the screen support ring and the mounting collar, wherein the retrieving force shears the at least one shear pin and disconnects the screen support ring from the mounting collar.

* * * * *